United States Patent [19]
Riondel

[11] 3,752,084
[45] Aug. 14, 1973

[54] AUTOMATIC OPERATION CONTROL DEVICE OF AN AUTOMOTIVE VEHICLE
[75] Inventor: Pierre Riondel, Geneva, Switzerland
[73] Assignee: Societe Anonyme des Ateliers de Secheron, Geneva, Switzerland
[22] Filed: May 18, 1972
[21] Appl. No.: 254,539
  Related U.S. Application Data
[63] Continuation-in-part of Ser. No. 21,385, March 20, 1970, abandoned.

[30] Foreign Application Priority Data
  April 23, 1969 Switzerland..................6187/69

[52] U.S. Cl.............. 105/61, 180/98, 180/105 E, 246/182 C
[51] Int. Cl............................................ B60l 15/22
[58] Field of Search.................. 105/61; 246/182 R, 246/182 B, 182 C, 187 B; 180/98, 105 E; 235/150.2

[56] References Cited
FOREIGN PATENTS OR APPLICATIONS
1,438,771  4/1969  Germany....................... 246/187 B
1,513,623  4/1969  Germany....................... 246/182 B Primary Examiner—Gerald M. Forlenza
Assistant Examiner—George H. Libman
Attorney—Richard K. Stevens, Robert J. Frank et al.

[57] ABSTRACT

An automatic operation control device for an automotive vehicle rolling along a given trail. A data registering member stores parameters relating to the maximum permissible speed as a function of the distance travelled, and parameters relating to the required time interval as a function of the distance travelled. Means are provided for reading these two sets of data. Comparator means compare the real speed with the required speed and the real time with the required time, for controlling the traction and braking means of the vehicle.

1 Claim, 3 Drawing Figures

AUTOMATIC OPERATION CONTROL DEVICE OF AN AUTOMOTIVE VEHICLE

This application is a continuation-in-part of my copending application Ser. No. 21,385 filed Mar. 20, 1970 now abandoned.

In the automatic control of an automotive vehicle, for instance of a tractor vehicle of a railway train, it is necessary for the automatic control device to take into consideration several criteria of which the most important is obviously the maximum permissible speed, this parameter being a function of the distance travelled. Another criterion, intervening in the control of the minimum energy consumption (see Swiss Pat. No. 464,283), is the order to cut off the current. This order may be given either by calculation at the time of departure from the station the time interval after which the current must be cut off, or, as in the patent mentioned above, by comparing a function of the distance travelled from the station, with the real time. The required time may also be determined by fixing the times of passage of the train at different points of the path. Up to now the parameters relating to the various criteria to be observed were registered on different components, whether these parameters were to be brought to the attention of the engine driver, or to be used for an automatic control.

The purpose of the invention is to simplify the control device by providing the same registering member for the various operational criteria.

In order to achieve this result, it is obviously necessary to cause the registering member to advance as a function of one and the same parameter which must be the distance travelled, in order to satisfy the maximum speed criterion, which is clearly a function of the distance travelled.

According to the present invention, the device for the control of an automotive vehicle as a function of the travelled distance comprises a. a data registering member located on said vehicle for storing parameters relating to the desired speed of said vehicle and to the required time interval as functions of said distance travelled, said data registering member having a first position indicating whether the output of said data registering member relates to the quantity speed or time, a second position indicating whether the output relates to the level or slope of said quantity, a third position indicating the value of the level or slope of said quantity and a fourth position indicating the value of the distance which must be travelled before the level or slope of said quantity is to be modified, b. means connected to said data registering member for reading the information stored in said data registering member and transforming said information into desired values which are comparable with measured values of the actual speed and actual time, said means including integration means for obtaining distance dependent integrations of the parameters for the change of the desired speed and time respectively, and c. comparator means for comparing said distance dependent integrations with the actual speed and actual elapsed time, the output of said comparator means controlling the traction and braking of said vehicle.

The drawing illustrates, by way of an example, an embodiment of the invention.

Figure 1:
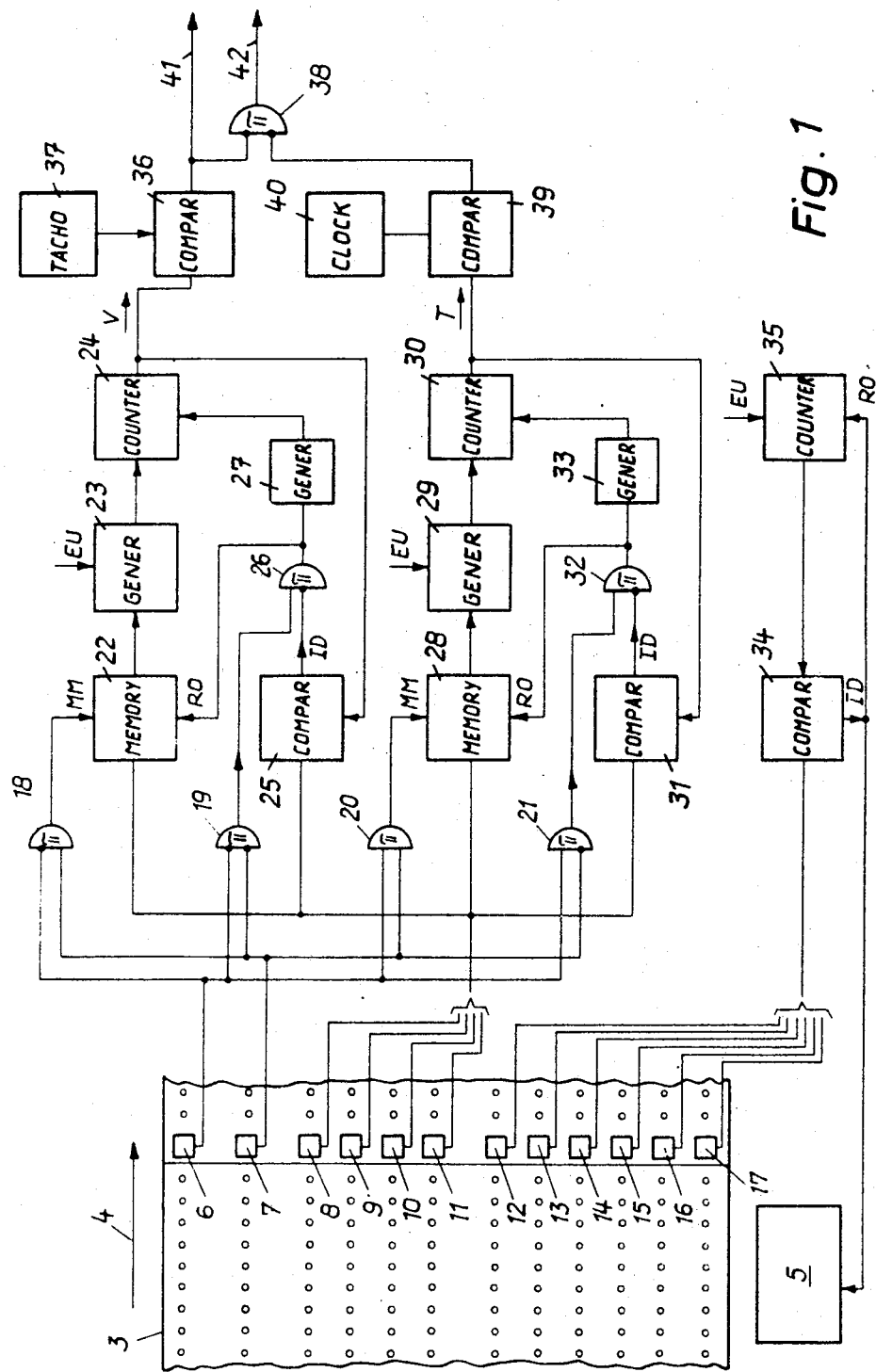
FIG. 1 is a block schema of a device enabling the automatic control to be effected as function of two criteria: the maximum permissible speed, and the required time.

The illustrated device comprises a single registering member 3 capable of being moved in regular steps in the direction of the arrow 4 under the control of an advancing mechanism 5. This member is, in the described embodiment, constituted by a perforated card. The device comprises a reading head provided with twelve feelers 6–17, each cooperating with a track on the card 3. The feeler 6 indicates which of the two functions V or T has to be modified. If V, the feeler 7 indicates if it is the level of V or the slope $dV/dE$ which must be modified; if T, the feeler 7 indicates if it is the level of T or the slope $dT/dE$ which must be modified. The set of feelers 8–11 indicates the value of the new parameter. As the feelers operate in the binary code, the four feelers 8 to 11 are thus capable of registering $2^4 = 16$ different values. As for the six feelers 12 to 17 they indicate the value of the distance which must be travelled up to a modification of one of the values V, T, $dV/dE$ or $dT/dE$.

The device comprises four logical gates 18 to 21, respectively actuating the gate 18 when a modification of the slope $dV/dE$ of V is to be effected, the gate 19 when a modification of the level of the speed V is to be effected, the gate 20 when a modification of the slope $dT/dE$ is to be effected and the gate 21 when a modification of the required time T is to be effected.

The circuit destined to generate the function $V=V$ (E) comprises in addition a memory 22, which, when the gate 18 is actuated, registers the value read by the four feelers 8 to 11, a pulse generator 23 which emits a train of pulses the number of which is proportional to the coefficient $dV/dE$ registered by the memory 22, every time it receives a pulse in E U, a cyclic counter 24 totalizing the pulses received from the generator 23 and the registered number of which represents the value of the function $V = V$ (E), a speed comparator 25 comparing the value read by the feelers 8 to 11 with the value of V registered in 24, a gate 26 receiving the output signals of the gate 19 and of the speed comparator 25 and finally a pulse generator 27 controlled by the gate 26 and the output signal of which constitutes a second input for the counter 24. The memory 22 is returned to zero by a pulse received in RO from the gate 26. The device also comprises a pulse generator, which is not shown, which emits a pulse EU every time the train has travelled a unit distance.

The generator of the function $T = T$ (E) comprises the same components 28 to 33 which are arranged and operate in the same manner as for the generator of the function $V = V$ (E).

The advancing mechanism 5 of the registering support 3 is controlled by the pulses ID emitted by the space comparator 34 each time that the number of pulses EU registered by the space counter 35 becomes equal to the number read by the feelers 12 to 17. The output pulse ID of the space comparator 34 also constitutes the return to zero pulse RO of the space counter 35, so that when the support 3 is moved on by one step by the emission of a pulse ID the counter 35 starts counting again from zero.

The function V is applied to the input of a comparator 36 the other input of which is constituted by the real speed provided by the tachometer 37. When V is smaller than the speed indication provided by the tachometer 37, the output signal of the comparator 36 causes the braking members in 41 to be actuated and is applied in addition to a gate 38, the output signal of which controls the traction motors in 42.

The device comprises in addition a comparator 39 receiving the signal T on the one hand and on the other an indication of the real time provided by a clock 40. The output signal of this comparator constitutes the second input for the gate 38.

The device operates as follows: when the slope $dV/dE$ has to be modified the gate 18 is actuated and the memory 22 registers the value read by the feelers 8 to 11. Every time the train runs through a unit distance, a pulse EU is applied to the pulse generator 23 the output of which produces a train of pulses the number of which is proportional to the coefficient registered in the memory 22. These pulses are totalized in the counter 24, the output signal of which is thus the value V. If this coefficient $dV/dE$ is equal to zero, the output signal of the memory 22 is equal to zero and the generator 23 ceases to produce pulses. When the value of the level V is to be modified, it is the gate 19 which is actuated and if the value registered in the counter 24 is not the same as that read by the feelers 8 to 11, the logical output ID of the comparator is (O) so that the gate 26 emits an output signal which, on the one hand brings the memory 22 back to zero, and on the other, starts the rapid counting generator 27 which emits pulses until the value registered in the counter is equal to that read by the feelers 8 to 11.

Referring to the relation between memory 22 and pulse generator 23, the counter in 23 is preadjustable so that each impulse EU puts it in a position corresponding to the inverse binary value of the output of 22 thus causing the oscillator to operate until the counter, actuated by the oscillator, has reached the zero position. If sensor 6 is switched on and operating, function T is in operation through gates 20 and 21. If sensor 6 is not operating, function V is in operation through gates 18 and 19. The switching of sensor 6 can be made by the perforated card 3.

As the generator of the function T operates in the same manner, its operation will not be described.

All of the elements used in this system are well known and are commercially available. For example, each of the following units shown in FIG. 2 can be obtained from the Texas Instruments Company under the listed serial numbers.

| Element | Serial No. |
|---|---|
| 22, 28 and 34 | 7475 |
| 23 and 29 | oscillator + 74192 + 7473 |
| 24, 30, 35 and 40 | 7493 |
| 25, 31 and 39 | 7486 + 7430 |

Elements 27, 33 and 37 are simply tachometers. Element 36 can be realized with a digital-analog decoder number 320 of the Hybrid System Corp., or by use of the device shown in the Motorola publication "Analog to Digital Conversion Techniques" AN 471, pages 15 – 19. Thus, each element in FIG. 1 is easily realized with commercially available integrated circuits and similar readily available components.

Figure 2:
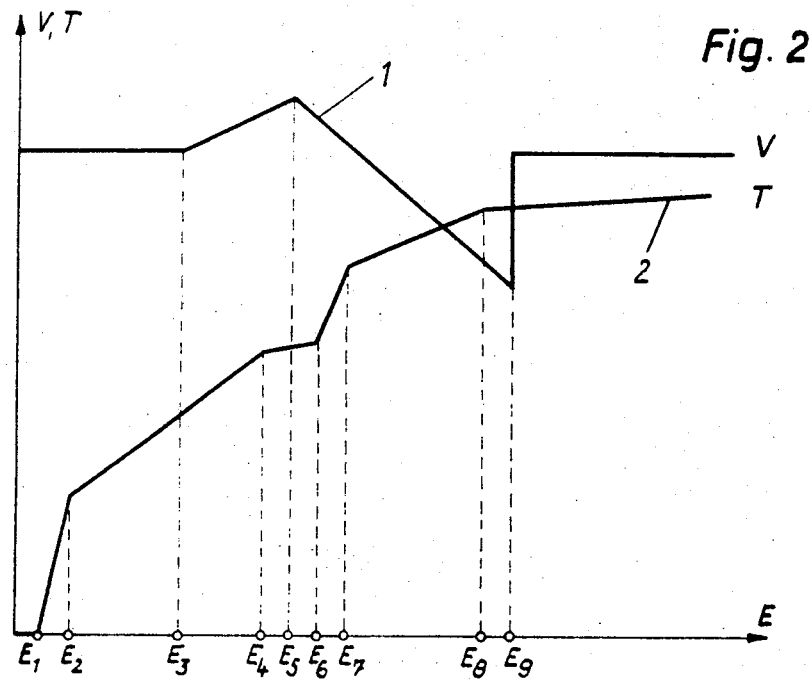
FIG. 2 shows two curves V (E) and T (E), i.e., speed and time as function of the distance travelled, according to a real timetable.

FIG. 2 illustrates two curves 1 and 2 representing the maximum permissible speed V as a function of the distance travelled E and the required time T in function of the same distance travelled E. It may be seen that these curves can be wholly determined, by specifying, at each one of the points where they undergo a change, their level on the one hand, and on the other their slope. The points $E_1 \ldots E_2$ of the path in which such changes occur are not necessarily equidistant. In the following it will be supposed that for each of the points $E_1 \ldots E_9$ only one of the curves undergoes a change, which in practice does not imply any limitation, as an interval $E_m - E_{m-1}$ separating two points may be chosen to be very small, for instance to be equal to 10 meters.

Figure 3:
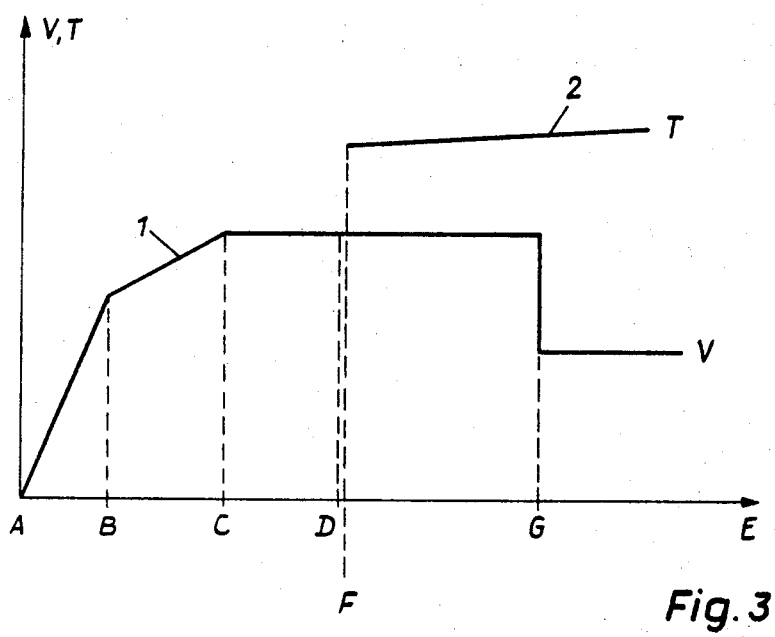
FIG. 3 shows also two curves V (E) and T (E), but here these functions are drafted according to a minimum energy consumption.

FIG. 3 shows another explanation of the working of the system according to FIG. 1, based on minimal energy consumption.

Suppose a vehicle leaving A with increasing speed until B, running thereafter with a lower increase between B and C, and thereafter with constant speed (no increase) from C onwards. Suppose further that D is the starting point of function T having a constant increase, and that G is a point from which on the function V is strongly diminished. (i.e., a decrease of speed.

The memory 3 is a perforated card, each column of which corresponding to one of the points A, B, C, D, F and G.

When the train starts, column A of card 3 is read: track 6 is not perforated and track 7 is perforated, so that elements 18, 22, 23 and 24 are energized, whereas tracks 8–11 give the slope of the function V between A and B. The running of the train creates impulses EU which in turn create a regular dependency of the function V through 23. The impulses EU are counted by 35 and when their number reaches the length of distance AB marked in column A on the tracks 12–17, element 5 (actuated by 34) shifts the perforated card forward by one step. Then column B will present the same perforations a column A for the tracks 6 and 7, so that the operation will be identical in B, but with other values given by tracks 8–17, which create a lower dependency of V during a different distance.

At point C, one will find column C with tracks 6 and 7 not perforated. This time, elements 19, 25, 26, and 27 will be energized, reducing the speed dependency to zero (through 22) and forcing the function V (through 24) to take a value corresponding to CG, if such had not already been the case.

After CD is left behind, column D of the perforated card is read, track 6 being then perforated and track 7 not perforated. Now elements 21, 31, 32 and 33 are energized so as to take function T (30) back to its starting value. However, as function T should increase after D, one selects a point F as close as possible to D, by making the distance (12–17) equal to one. At the first impulse EU the perforated card will be shifted and column E will be read. Now tracks 6 and 7 are perforated and elements 20, 28 and 29 are energized so as to reduce the slope of function T. Thereafter, each impulse EU provokes an increase of function T (30) by a value corresponding to tracks 8–11 of column E. At the end of distance FG, the perforated card is again shifted and column F will be read. As tracks 6 and 7 are not perforated, elements 19, 25, 26, and 27 will operate, as at point C, reducing the function T to a lower value.

What I claim is:

1. A device for the control of an automotive vehicle as a function of the travelled distance comprising
   a. a data registering member located on said vehicle for storing parameters relating to the desired speed of said vehicle and to the required time interval as functions of said distance travelled, said data registering member having a first position indicating whether the output of said data registering member relates to the quantity speed or time, a second position indicating whether the output relates to the level or slope of said quantity, a third position indicating the value of the level or slope of said quantity and a fourth position indicating the value of the distance which must be travelled before the level or slope of said quantity is to be modified,
   b. means connected to said data registering member for reading the information stored in said data registering member and transforming said information into desired values which are comparable with measured values of the actual speed and actual time, said means including integration means for obtaining distance dependent integrations of the parameters for the change of the desired speed and time resectively, and
   c. comparator means for comparing said distance dependant integrations with the actual speed and actual elapsed time, the output of said comparator means controlling the traction and braking of said vehicle.

* * * * *